(12) United States Patent
Vonach (10) Patent No.: US 9,727,070 B2
(45) Date of Patent: Aug. 8, 2017

(54) APPARATUS AND METHOD FOR SUPPLYING DIFFERENT OUTPUT CURRENTS OR POWERS TO AN ILLUMINANT BY SELECTABLE RESISTANCES AT OUTPUT STAGE

(71) Applicant: TRIDONIC GMBH & CO KG, Dornbirn (AT)

(72) Inventor: Christoph Vonach, Dornbirn (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 353 days.

(21) Appl. No.: 14/397,183

(22) PCT Filed: Apr. 15, 2013

(86) PCT No.: PCT/AT2013/000073
§ 371 (c)(1),
(2) Date: Oct. 25, 2014

(87) PCT Pub. No.: WO2013/159132
PCT Pub. Date: Oct. 31, 2013

(65) Prior Publication Data
US 2015/0331436 A1    Nov. 19, 2015

(30) Foreign Application Priority Data

Apr. 26, 2012  (DE) .................. 10 2012 008 499

(51) Int. Cl.
*H05B 37/02*    (2006.01)
*G05F 1/66*    (2006.01)
(Continued)

(52) U.S. Cl.
CPC ............... *G05F 1/66* (2013.01); *G05B 15/02* (2013.01); *H05B 33/0848* (2013.01)

(58) Field of Classification Search
CPC .................................................. H05B 33/0887
(Continued)

(56) References Cited

U.S. PATENT DOCUMENTS

| 3,117,270 A | * | 1/1964 | Tailleur | H02M 3/3378 |
| | | | | 327/535 |
| 4,150,423 A | * | 4/1979 | Boschert | H02M 3/3378 |
| | | | | 363/25 |

(Continued)

FOREIGN PATENT DOCUMENTS

| DE | 10051528 A1 | 5/2002 |
| DE | 102008033176 A1 | 1/2010 |

(Continued)

*Primary Examiner* — Thuy Vinh Tran
(74) *Attorney, Agent, or Firm* — Volpe and Koenig, P.C.

(57) ABSTRACT

An apparatus for supplying power to an illuminant can be configured for use for different illuminants, a configuration can be chosen by a resistor on a secondary side of the apparatus. A primary side has at least one switch and a control device. The control device is set up to bring about clocked switching of the at least one switch in an operating phase in order to take a measured variable captured during the operating phase on the primary side, the measured variable is dependent on the resistor, as a basis for identifying a configuration stipulated by the resistor. The control device is set up in order to control the apparatus in a further operating phase on the basis of the identified stipulated configuration. A method for controlling the apparatus is also provided.

13 Claims, 5 Drawing Sheets

(51) Int. Cl.
*G05B 15/02* (2006.01)
*H05B 33/08* (2006.01)

(58) Field of Classification Search
USPC .............. 315/224, 225, 226, 276, 291, 308
See application file for complete search history.

(56) References Cited

U.S. PATENT DOCUMENTS

| | | | | |
|---|---|---|---|---|
| 4,255,782 | A | * | 3/1981 | Joyce .................... H02M 5/293 |
| | | | | 363/159 |
| 4,334,263 | A | * | 6/1982 | Adachi ............... H02M 3/3378 |
| | | | | 363/25 |
| 6,975,214 | B2 | | 12/2005 | Schleicher |
| 8,723,428 | B2 | * | 5/2014 | Yao .................... H05B 33/0815 |
| | | | | 315/177 |
| 2004/0090189 | A1 | | 5/2004 | Yoneda et al. |
| 2011/0260648 | A1 | | 10/2011 | Hamamoto et al. |
| 2013/0057162 | A1 | | 3/2013 | Pollischansky |

FOREIGN PATENT DOCUMENTS

| | | |
|---|---|---|
| DE | 102010029100 A1 | 11/2011 |
| EP | 1244334 A2 | 9/2002 |
| EP | 1379108 A1 | 1/2004 |
| EP | 1868284 A1 | 12/2007 |

\* cited by examiner

APPARATUS AND METHOD FOR SUPPLYING DIFFERENT OUTPUT CURRENTS OR POWERS TO AN ILLUMINANT BY SELECTABLE RESISTANCES AT OUTPUT STAGE

FIELD OF THE INVENTION

The invention relates to an apparatus for supplying power to an illuminant and to a method for operating such an apparatus. The invention relates in particular to those apparatuses and methods in which energy is supplied to an illuminant, in particular to an illuminant which comprises one or more light-emitting diodes, using a so-called SELV ("separated extra-low voltage" or "safety extra-low voltage") device.

BACKGROUND

Operating devices for light-emitting means, for example LED converter devices, are used in order to supply electrical energy to the light-emitting means. Corresponding electrical circuits are provided with which the operating device to which, for example, the mains voltage is supplied as input voltage achieves a supply of energy to the light-emitting means with a specific voltage, a specific current or a specific power. In general, it is desirable to make an operating device configurable such that it is usable for different light-emitting means. For this purpose, a user-defined setting option can be provided with which the operating device can be switched over, for example, between different output currents and/or output powers and/or output voltages.

For safety reasons, operating devices for light-emitting means have electrical isolation, wherein a galvanically decoupled energy transfer between a region with a relatively high voltage and a region with a relatively low voltage takes place. The galvanically decoupled energy transfer can be achieved by the use of a transformer or another transfer device. Such galvanic isolation or electrical isolation is required in the case of operating devices for light-emitting means for safety reasons in order to separate an SELV region from regions with a relatively high supply voltage, in particular mains voltage, by means of a so-called potential barrier or SELV barrier. For safety reasons, it is often necessary for at least those elements which can be set by the end user to be provided in the SELV region of the operating device. If setting elements are provided in the SELV region for safety reasons, the SELV region can have corresponding evaluation logic for determining the setting selected by the user. This setting can be transferred by the secondary-side logic via a digital interface via the SELV barrier in order to be used by control logic in the non-SELV region. The use of corresponding logic in the SELV region, i.e. on the secondary side of a transfer device, is associated with additional costs and additional complexity, however.

LED modules themselves can have resistances which act as a signature in respect of the class to which the LEDs used belong. The resistances can be read from logic integrated in the LED module and be used to drive switches in the LED module. The logic integrated in the LED module can have a data interface in order to feed back data to other devices. Even in the case of such approaches, the use of corresponding logic for reading the signature in the SELV region, for example in the LED module, is necessary.

There is a need for apparatuses and methods which provide improvements in respect of the mentioned aims. In particular, there is a need for apparatuses and methods in which simple adjustability of the operation, for example to different output currents, can be achieved, even when no data interface is provided.

SUMMARY

In accordance with the invention, an apparatus and a method having the features specified in the independent claims are specified. The dependent claims define embodiments.

In accordance with exemplary embodiments of the invention, an apparatus for supplying energy to an illuminant has a primary side and a secondary side, wherein there is electrical isolation between the primary side and the secondary side. The primary side may be, for example, the non-SELV region of the apparatus. The secondary side may be the SELV region of the apparatus. A resistance is provided on the secondary side and can be used to select one of many configurations for operating the apparatus. Each of a plurality of different resistance values can be assigned, for example, to one of a plurality of possible output currents and/or output powers of the operating device. By selecting a corresponding resistance value, for example by actuating dip switches and/or actuating a potentiometer, one of the plurality of configurations can be selected in a user-defined manner on the secondary side. For example, one of a plurality of output currents can be selected in a user-defined manner.

A control device, which is provided on the primary side of the apparatus, identifies the configuration which is established by the resistance which is arranged on the secondary side on the basis of a measured variable detected at a measurement point on the primary side, in one operating phase. For this purpose, the control device in the operating phase can switch at least one switch of the primary side in clocked fashion. A transformer which, during useful operation, is used for transferring energy from the primary side to the secondary side can thus be used also as transfer device for reading the secondary-side resistance.

In the case of the apparatus, the identification of the resistance set on the secondary side takes place on the basis of a measured variable, which is detected at a measurement point on the primary side, i.e. in the non-SELV region. The control device, which controls the apparatus and which is provided in the non-SELV region, can identify the secondary-side resistance which is set, for example, to a specific value by a user and control the apparatus correspondingly.

In the case of the apparatuses and methods in accordance with exemplary embodiments, it is not necessary to provide separate logic for identifying the resistance set on the secondary side and/or a data interface between secondary-side logic and the control device on the primary side in order to feed back digital data relating to the set resistance via an SELV barrier.

The measured variable, which is detected on the primary side for identifying the resistance and therefore for identifying the selected configuration, can be for example, proportional to a current in a primary coil of the transformer or to a peak value of this current. This current can be detected in different ways, for example by tapping off a voltage drop across a measuring resistor.

Once the control device has identified the configuration which is established by the resistance provided on the secondary side on the basis of the measured variable detected on the primary side, the control device can initiate a further operating phase. In the further operating phase, the control device controls the apparatus depending on the identified configuration which is established by the resistance on the secondary side. For example, the control device can determine, on the basis of a family of characteristics, operational parameters which are assigned to the selected configuration and can control elements of the primary side in accordance with the operational parameters. In this case, the operational parameters are each established in such a way that the desired output current and/or the desired output power and/or the desired output voltage is provided, which is assigned to the resistance set on the secondary side.

The apparatus can be configured in such a way that the resistance on the secondary side is automatically decoupled from a secondary coil of the transformer after a time period such that no current flow from the secondary coil through the resistance is possible any more. The apparatus can be configured in such a way that the resistance is decoupled automatically from the secondary coil of the transformer correspondingly after a predetermined time. A first switching means which is automatically switched from the on state to the off state after the predetermined time in order to decouple the resistance on the secondary side from the secondary coil can be provided. As a result, it is possible to avoid the occurrence of energy dissipation in the resistance even in the further operating phase once the resistance has already been read via the transformer by the primary-side control device.

The apparatus can be configured in such a way that an output of the apparatus to which an illuminant can be coupled is coupled to the secondary coil only once the operating phase in which the selected configuration is identified has elapsed such that a current flow from the secondary coil through the light-emitting means is possible. The apparatus can be configured in such a way that the output is automatically coupled to the secondary coil of the transformer after a predetermined time. A second switching means which is automatically switched from the off state to the on state after the predetermined time in order to provide energy for the light-emitting means at the output of the apparatus can be provided. It is thus possible to avoid a situation whereby, owing to the coupling of the light-emitting means to the secondary coil during the operating phase in which the selected configuration is intended to be determined, reading of the resistance via the transformer is made more difficult or distorted.

The control device can determine, on the basis of families of characteristics, operational parameters for the apparatus which correspond to the selected configuration. The control device can determine one or more operational parameters depending on a peak value of a current in the primary coil of the transformer by means of a table query, for example. The apparatus can comprise a power factor correction circuit and a resonant converter with half-bridge driving. The operational parameters which are determined by the control device depending on the configuration selected via the resistance can comprise at least one operational parameter of the power factor correction circuit. The at least one operational parameter of the power factor correction circuit can comprise a switching frequency, an on time ("Ton time") and/or an off time ("Toff time") of a controllable power switch of the power factor correction circuit. As an alternative or in addition, the control device can select an operating mode for the power factor correction circuit depending on the configuration selected via the resistance. For example, the power factor correction circuit can be controlled, depending on the set impedance value, in such a way that CCM ("continuous conduction mode") operation, BCM ("borderline conduction mode" or "boundary conduction mode") operation or DCM ("discontinuous conduction mode") operation of the power factor correction circuit is used. The operational parameters which are determined by the control device depending on the configuration selected via the resistance can comprise at least one operational parameter of the resonant converter. The at least one operational parameter of the resonant converter can comprise a switching frequency, an on time ("Ton time") and/or an off time ("Toff time") and/or a dead time of switches in a half-bridge which are switched by the control device. As an alternative or in addition, the control device can select an operating mode for the resonant converter depending on the configuration selected via the resistance. For example, the resonant converter can be controlled, depending on the set resistance value, in such a way that, selectively, pulsed operation, in which both switches in the half-bridge remain switched in the off state for a time period, or a non-pulsed operation of the half-bridge driving takes place.

The different configurations of the apparatus can be assigned to different output currents. Depending on the configuration selected via the resistance, the control device can control the apparatus in such a way that the output current assigned to the identified resistance is generated.

The resistance on the secondary side can comprise an element which is actuable mechanically by a user. For example, the resistance can comprise a dip switch or a plurality of dip switches, with which a plurality of individual resistances are selectable. It is also possible for another type of settable resistance to be used, for example a potentiometer, which can be set using a sliding element or rotary knob.

The control device can be an integrated semiconductor circuit, in particular an application-specific integrated semiconductor circuit (ASIC, "application-specific integrated circuit"). The control device can have a connection which is coupled to a measurement point on the primary side, at which the measured variable for identifying the resistance is detected. The corresponding connection of the control device can be configured such that an input signal at the connection in the operating phase gives information on the resistance on the secondary side and is evaluated by the control device in order to determine the selected configuration. The connection of the control device can be configured in such a way that, in the further operating phase, the input signal at the connection is evaluated for further control or regulation functions. If, for example, information relating to a current through a primary coil of a transformer and/or relating to a peak value of such a current is provided at the connection as input signal, in the further operating phase, i.e. during useful operation, the input signal can be monitored in order to selectively implement fault clearance if an overcurrent state is identified.

Integrated semiconductor circuits which are used for controlling operating devices for light-emitting means often have an input for a signal which represents the current or peak current in a converter. In the case of apparatuses and methods in accordance with exemplary embodiments, this input can also be used to identify the secondary-side resistance by a measurement on the primary side in the operating phase in which the selected configuration is intended to be identified. It is not necessary to modify the corresponding integrated semiconductor circuits in such a way that they comprise further connections.

The apparatus can be an operating device for an illuminant. The apparatus can be an LED converter device.

The apparatus can be a combination of operating device for an illuminant and light-emitting means connected thereto. The apparatus can comprise an LED converter device and an LED module coupled thereto. The secondary-side resistance can be provided on the secondary side of the LED converter device or in the LED module.

In accordance with a further exemplary embodiment, a lighting system is specified which comprises the apparatus and an illuminant coupled thereto. The light-emitting means can comprise one or more light-emitting diodes (LEDs). The LEDs can comprise inorganic and/or organic LEDs. The LEDs can be integrated in an LED module, which is embodied separately from the LED converter device. The lighting system can furthermore comprise a central control system, which is configured to communicate dimming commands to the LED converter device or evaluate signals transmitted from the LED converter device.

In accordance with a further exemplary embodiment, a control device for controlling an operating device for an illuminant, in particular for controlling an LED converter device, is specified. The control device comprises a connection for receiving an input signal, which is dependent on a measured variable detected in a non-SELV region of the apparatus. The control device is configured to identify a resistance which is set on a secondary side of the apparatus, depending on the input signal which is received in an operating phase, and thus to identify the configuration selected in a user-defined manner. For example, such an operating phase can be a phase during starting of the LED converter device.

The control device can be configured to continue to monitor the input signal at the connection in a further operating phase, in which the control device controls control signals in accordance with the selected configuration identified in order to detect a fault state, in particular an overcurrent state. The control device can be configured to automatically implement fault clearance if the overcurrent state is identified.

In a further exemplary embodiment, the invention also relates to an apparatus for supplying energy to an illuminant, wherein the apparatus is configurable for use for different light-emitting means, wherein a configuration is selectable by means of a resistance at an output of the apparatus, and wherein the apparatus has a DC-to-DC converter having at least one switch and a control device, wherein the control device is configured to effect clocked switching of the at least one switch in one operating phase in order to identify a configuration established by the resistance depending on a measured variable detected during the operating phase within the DC-to-DC converter, which measured variable is dependent on the resistance, and, in a further operating phase, to control the apparatus depending on the established configuration identified.

Configurations of the method for operating an apparatus in accordance with exemplary embodiments and the effects achieved in each case thereby correspond to the configurations described with reference to the apparatuses. The method can be implemented automatically using an apparatus in accordance with one exemplary embodiment.

BRIEF DESCRIPTION OF THE DRAWINGS

The invention will be explained in more detail below with reference to the attached drawing using preferred exemplary embodiments.

The features of the various exemplary embodiments described below can be combined with one another insofar as this is not expressly ruled out in the description below.

DETAILED DESCRIPTION OF THE PREFERRED EMBODIMENTS

Figure 1:
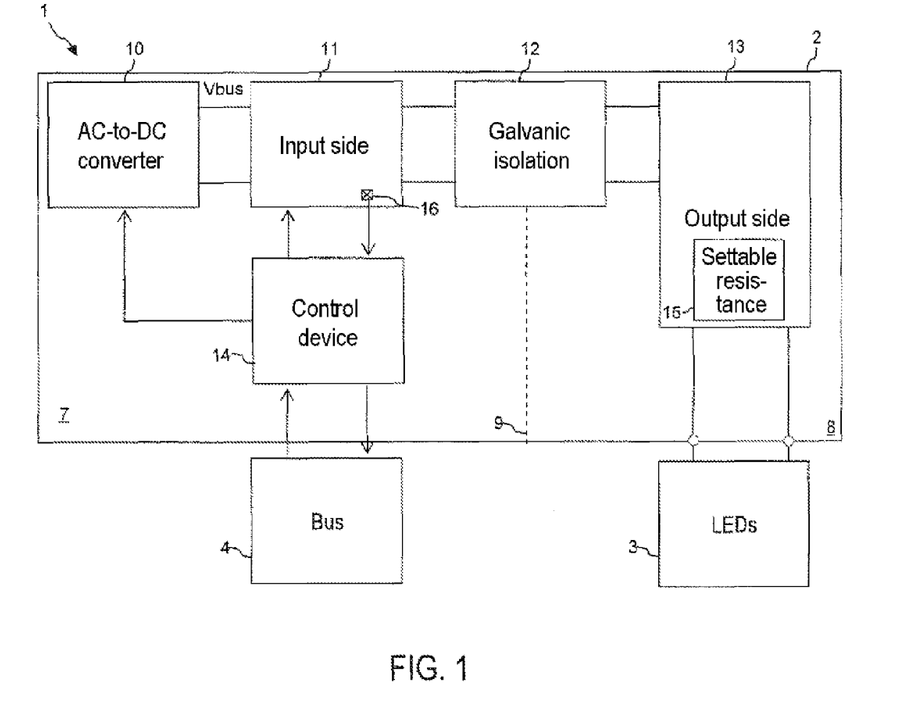
FIG. 1 shows a schematic illustration of a lighting system having an apparatus in accordance with one exemplary embodiment.

FIG. 1 shows a lighting system 1 in which an operating device 2 in accordance with an exemplary embodiment supplies energy to an illuminant 3. The illuminant 3 can comprise a plurality of light-emitting diodes (LEDs), which can be inorganic and/or organic LEDs. The operating device 2 can be configured as an LED converter device and is an embodiment of an apparatus for supplying power to an illuminant in accordance with exemplary embodiments. The LED converter device 2 can be configured in such a way that it outputs a constant current, whose current intensity can be selected via a selector device having a resistance 15 which can be set in a user-defined manner to a plurality of resistance values. The LED converter device 2 can comprise an interface for communication with a central control device and can be configured to receive commands via the interface and/or output status messages to a bus 4.

The LED converter device 2 can be configured as an SELV device, in which a non-SELV region 7 and an SELV region 8 are separated by an SELV barrier 9. There is corresponding electrical isolation. The non-SELV region 7 and the SELV region 8 can be galvanically isolated. A primary side, i.e. the non-SELV region 7, can comprise an AC-to-DC converter 10. The AC-to-DC converter 10 can be configured to be coupled to a mains voltage on the input side. The AC-to-DC converter 10 can comprise a rectifier and a circuit for power factor correction (PFC). The AC-to-DC converter 10 provides a bus voltage Vbus to a DC-to-DC converter, which has an input side 11 and an output side 13 galvanically isolated therefrom. Galvanic isolation is achieved by a transformer 12 or another conversion device. It would also be possible for the AC-to-DC converter 10 to be integrated in the DC-to-DC converter, i.e. the DC-to-DC converter takes on the functionality of the AC-to-DC converter 10. The DC-to-DC converter would in this case take up a DC voltage with a sinusoidal amplitude as input voltage and, in addition to the function of energy transfer to the secondary side, would also perform the function of power factor correction. In this case, a rectifier could be connected at the input upstream of the DC-to-DC converter.

The LED converter device 2 has a control device 14. The control device 14 can be an integrated semiconductor circuit, in particular an application-specific integrated semiconductor circuit (ASIC, "application-specific integrated circuit"). The control device 14 is provided in the non-SELV region 7, i.e. as part of the primary side.

The LED converter device 2 is configured in such a way that the control device 14 identifies the configuration which is selected by the resistance 15 on the secondary side 8 depending on a measured variable which is detected at a measurement point 16 in the non-SELV region 7. It is possible for a plurality of discrete resistance values to be used for the resistance 15, which values can be assigned to different output currents and/or output powers, for example. The control device 14 controls the LED converter device 2 automatically depending on the identified resistance 15 and therefore depending on the identified selected configuration in order to provide the output current, the output voltage and/or the output power which is assigned to the configuration selected via the resistance 15.

The resistance 15 can comprise, for example, dip switches in order to enable manual adjustability. For reading the resistance 15, the control device 14 can drive, for example, the DC-to-DC converter with the input side 11 in order to use the transformer for reading the resistance 15 as well. Such an identification of the resistance 15 set on the secondary side can be performed selectively in one operating phase once the LED converter device 2 has been started. In a later further operating phase, which corresponds to useful operation, the resistance 15 on the secondary side 8 can automatically be decoupled from the transformer. In this further operating phase, the control device 14 controls the LED converter device 2 in such a way that energy is provided to the illuminant 3. The secondary side 8 can be configured in such a way that energy is only supplied to the illuminant 3 selectively when the resistance 15 is decoupled from the secondary coil. During useful operation, i.e. when energy is supplied to the illuminant 3, the control device 14 can furthermore monitor the signal detected at the measurement point 16 in order to implement fault identification.

In the case of the LED converter device 2, identification of the resistance 15 set on the secondary side in the SELV region 8 takes place depending on the measured variable detected at the measurement point 16 on the primary side 7. It is not necessary to provide separate logic for reading the set resistance 15 in the SELV region 8 and/or a data interface for communicating corresponding data via the SELV barrier 9.

Apparatuses and methods in accordance with exemplary embodiments will be described in more detail with reference to FIGS. 2-9.

Figure 2:
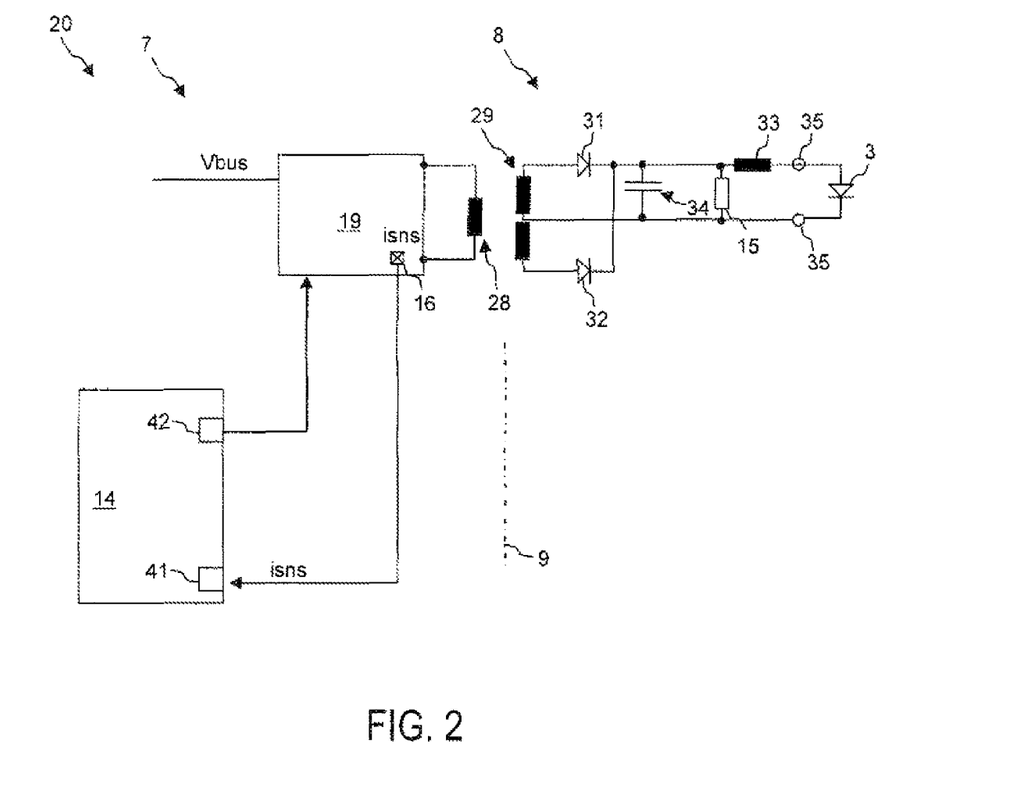
FIG. 2 shows a circuit diagram of an apparatus in accordance with one exemplary embodiment.

FIG. 2 shows a circuit diagram of an apparatus 20 in accordance with an exemplary embodiment. The apparatus 20 comprises a primary side 7 and a secondary side 8. There is electrical isolation between the primary side 7 and the secondary side 8. A transformer with a primary coil 28 and a secondary coil 29 can be provided for the isolation. The apparatus 20 can be configured as an LED converter device. The secondary side 8 can be an SELV region which is separated from the primary side 7 by an SELV barrier 9. The apparatus 20 can comprise further components (not illustrated in FIG. 2), for example a rectifier for rectifying an AC voltage, which can be the mains voltage, and a power factor correction circuit for smoothing the rectified AC voltage.

Depending on the configuration of the operating device, the primary side 7 can comprise different components, for example a resonant converter with full-bridge or half-bridge driving. The resonant converter can comprise, for example, a half-bridge circuit 19 with a resonant circuit connected to the half-bridge, for example an LLC resonant circuit. Other configurations are possible, for example the use of a full-bridge circuit or the use of a converter without a resonant circuit. Energy is supplied to the circuit 19 by a supply voltage Vbus, which can be provided, for example, by a power factor correction circuit. During operation, the control device 14 can control switches of the half-bridge circuit 19. In this case, each of the switches can be switched in each case at the same switching frequency. The control device 14 controls the first switch and the second switch of the half-bridge circuit in such a way that at most one of the two switches is switched on at any time. In order to adapt to different output currents selected in a user-defined manner, the control device 14 can change the switching frequency, for example, in order to set the value of the frequency-dependent transfer function or the gain.

The secondary side 8 can have a rectifier which is connected downstream of the secondary coil 29 and which can be formed by a first diode 31 and a second diode 32, for example. A center of the secondary coil 29 can be coupled to an output of the secondary side 8. Ends of the secondary coil 29 can be coupled to the output 35 via the diodes 31 and 32. In order to smooth the output current, an inductive element 33, for example a coil, can be provided, through which current is supplied to the output 35. An output capacitor 34 can be connected between the outputs of the rectifier.

In order to make the apparatus 20 configurable by the end user, a resistance 15 is provided on the secondary side, which resistance can have one of a plurality of different resistance values in order to enable selection of one of a plurality of configurations for the operation of the apparatus 20. The resistance 15 is coupled to the secondary coil 29. For example, the resistance 15 can be connected in parallel with the output capacitor 34.

In general, the control device 14 controls the apparatus in at least two different operating phases.

In one operating phase, the control device 14 uses the transformer to identify the resistance 15 that is set on the secondary side and thus identify the configuration which is established for the subsequent useful operation. For this purpose, the control device 14 can switch, in clocked fashion, at least one switch of the circuit 19 at a preset, fixed switching frequency. This switching frequency can be close to the frequency at which a transfer function has a maximum. Further parameters for this operating phase, such as, for example, on time and off time of the switch switched by the control device 14, can likewise have fixedly preset values. The control device identifies the resistance 15 which is set on the secondary side depending on a measured variable, which is detected at a measurement point 16 on the primary side 7 in this operating phase. The secondary side 8 can be configured such that, in this operating phase, no current for the illuminant 3 is provided at the output 35.

In the operating phase which is performed in order to identify the resistance 15, the load on the transformer is dependent on the resistance value of a plurality of resistance values to which the resistance 15 is set. Correspondingly, the resistance value that the resistance 15 has can be identified on the basis of the measured variable which is detected on the primary side 7. For example, a current isns through the primary coil 28 or a peak value of the current flowing through the primary coil 28 can be used as measured variable. This current can be detected as the voltage drop across a measuring resistor at the measurement point 16.

Depending on the selected configuration identified in the operating phase, which configuration is established by the resistance 15, the control device 14 can determine operational parameters for a subsequent further operating phase. These operational parameters can be determined on the basis of a family of characteristics. The operational parameters determined on the basis of a family of characteristics can comprise, for example, a switching frequency, an on time ("Ton time") and/or an off time ("Toff time") of switches in the circuit 19.

It is also possible for further measured variables such as, for example, the bus voltage Vbus to be evaluated as detected measured variable in addition or as an alternative. For example, the present value of the bus voltage Vbus can also be taken into consideration as well in the evaluation of the current isns through the primary coil 28 or the peak value of the current flowing through the primary coil 28 since, by virtue of the knowledge of the present value for the current through the switch 22 or through the primary coil 28 and the bus voltage Vbus, it is possible to draw a conclusion on the power consumed by the DC-to-DC converter since current multiplied by voltage gives the power.

In the further operating phase, the control device 14 controls the at least one switch in the circuit 19 at a switching frequency, which can be dependent on the selected configuration. By selecting the switching frequency depending on the configuration, the frequency-dependent transfer function and therefore the gain of the converter with the transformer 28, 29 can be set. Further parameters for the further operating phase, such as, for example, the on time and/or the off time of the switch switched by the control device 14, can likewise be selected depending on the configuration established via the resistance 15. The secondary side 8 can be configured in such a way that, in this further operating phase, there is no current flowing through the resistance 15 any more.

The control device 14 has an input 41 for identifying, in the first operating phase, the resistance 15 on the secondary side 8 depending on the measured variable isns. The control device 14 can evaluate the signal received at the input 41 in order to identify the set resistance in dependence thereon. This can take place in various ways. For example, the control device 14 can determine a peak value of a current in the primary coil 28, while the first operating phase is proceeding. The control device 14 can determine operational parameters on the basis of a family of characteristics depending on the peak value, on the basis of which operational parameters the control device 14 in the subsequent further operating phase performs the driving of switching elements on the primary side. The control device 14 can output control signals via at least one further connection 42 depending on the measured variable isns detected on the primary side in order to control the operating device in accordance with the resistance set on the secondary side. In particular, the control device 14 can control elements on the primary side 7 in the further operating phase in such a way that an output current and/or an output power which is assigned to the resistance 15 or to the configuration selected thereby is provided at the output 35 of the secondary side 8.

The identification of the resistance 15 set on the secondary side can be performed selectively by the control device 14 only in specific operating phases or time intervals, for example during starting of the apparatus 2.

The resistance 15 can comprise one or more mechanically actuable elements, for example dip switches, in order to enable manual setting of the resistance.

Figure 3:
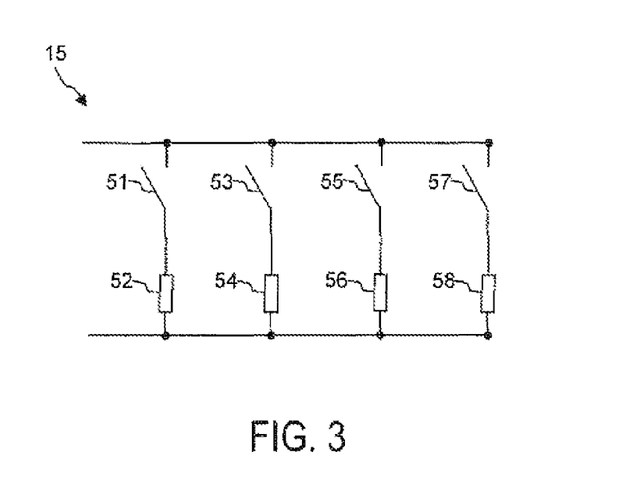
FIG. 3 illustrates an implementation of a resistance on a secondary side of apparatuses in accordance with exemplary embodiments.

FIG. 3 illustrates a configuration of the resistance 15, which can be used on the secondary side of the apparatuses in accordance with exemplary embodiments. The resistance 15 which can be used to select different configurations for the operation of the apparatus 2 can comprise a plurality of dip switches 51, 53, 55, 57. The selector device can comprise a plurality of different individual resistances 52, 54, 56, 58, wherein each of the individual resistances is in each case connected in series with one of the dip switches 51, 53, 55, 57. The plurality of series circuits of dip switches and associated resistance are connected in parallel with one another. By setting the dip switches 51, 53, 55, 57, a plurality of discrete resistance values can be set. The corresponding total resistance can be detected at the primary-side measurement point 16 via the transformer 28, 29. The individual resistances 52, 54, 56, 58 can be selected in such a way that in each case precisely one of a plurality of resistance values is assigned to each of the various possible switch positions of the totality of the dip switches 51, 53, 55, 57. That is to say that the individual resistances 52, 54, 56, 58 can be selected in such a way that each of the settable resistance values can be maintained for only one switch position of the dip switches 51, 53, 55, 57. In particular, the individual resistances 52, 54, 56, 58 can have resistance values that are different than one another.

Other configurations are possible for providing a settable resistance for selecting different configurations on the secondary side. For example, a potentiometer or another settable resistance can be used.

Figure 4:
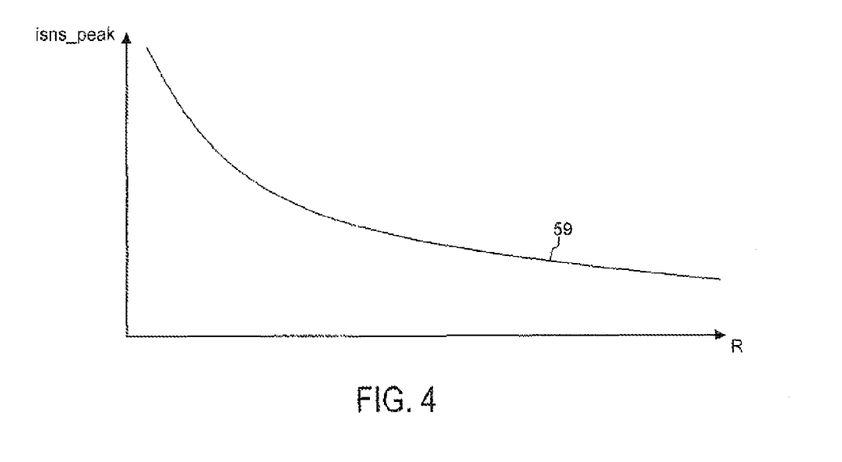
FIG. 4 illustrates a dependence of a peak value of a current on the primary side on the resistance on the secondary side.

FIG. 4 illustrates the determination of a selected configuration, which is established by the resistance 15 on the secondary side, depending on the measured variable detected on the primary side. For example, a peak value of a current which is flowing through the primary coil 28 when a relatively low-potential switch of a half-bridge circuit is switched to the on state can be used as measured variable. FIG. 4 shows an illustration 59 of the peak value of the current depending on the resistance value of the resistance 15 on the secondary side.

The control device 14 can be configured to determine the peak value of the current flowing through the primary coil 28 when a relatively low-potential switch of a half-bridge circuit is switched to the on state. The resistance value of the resistance 15, to which the transformer is coupled on the secondary side, can be determined from the peak value of the current. For this purpose, a curve, as is illustrated in FIG. 4, can be used, for example, in order to define a corresponding family of characteristics used by the control device 14.

The primary side 7 and/or secondary side 8 of the apparatus 20 can have different configurations in order to ensure efficient energy transfer to the illuminant 3 and/or in order to keep dissipation on the secondary side, which can be brought about by the resistance 15, low. For example, the secondary side 8 can be configured in such a way that no energy is supplied to the illuminant 3 during the operating phase in which the configuration selected via the resistance 15 is determined. The secondary side 8 can be configured in such a way that no energy is no longer supplied to the resistance 15 as soon as energy is supplied to the illuminant 3. Corresponding switching means can be provided on the secondary side 8.

Figure 5:
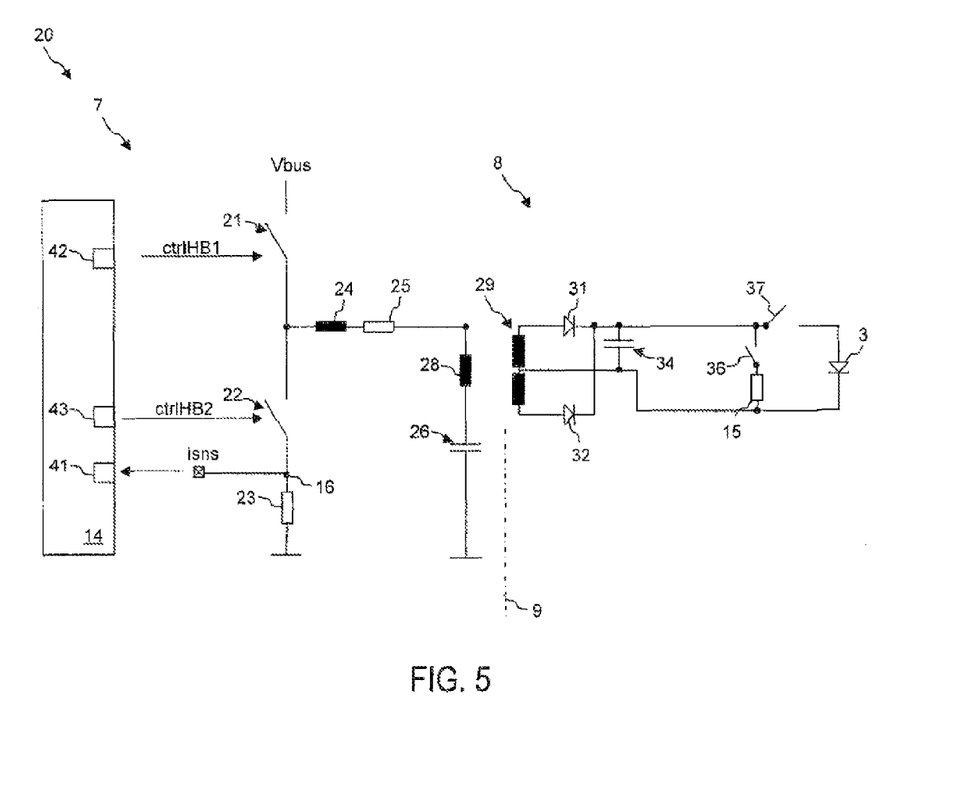
FIG. 5 shows a circuit diagram of an apparatus in accordance with a further exemplary embodiment.

FIG. 5 illustrates such a configuration of the apparatus 20. Elements and devices which correspond in terms of function and/or configuration to elements and devices which have been described with reference to FIGS. 1-4 are denoted by the same reference symbols.

The apparatus 20 has a resonant converter having half-bridge driving. A variable which is proportional to the current flowing in the primary coil 28 when a relatively low-potential switch in the half-bridge is in the on state can be used as measured variable which is detected on the primary side and which enables the identification of the resistance 15 on the secondary side.

The apparatus 20 can comprise a rectifier (not illustrated in FIG. 5), which rectifies an input voltage of the apparatus, for example a mains voltage, and provides the rectified AC voltage Vin to a power factor correction circuit (not illustrated in FIG. 5) of the apparatus 20. An output of the power factor correction circuit is connected to an input of the LLC resonant converter and provides the voltage Vbus generated by the power factor correction circuit as supply voltage for the LLC resonant converter.

The half-bridge circuit has two controllable switches 21, 22, which can be driven by the control device 14. The switches 21, 22 can be in the form of FETs, in particular in the form of MOSFETs. A current isns flowing in the low-potential side of the half-bridge can be monitored at a shunt resistor 23 in order firstly to identify the secondary-side resistance 15 in order to identify the selected configuration and in order to identify an overcurrent situation, for example, during subsequent useful operation. A resonant circuit, which can be configured as a series resonant circuit, can be connected to a node between the switches 21, 22. The resonant circuit can be, for example, an LLC series resonant circuit, which comprises two inductances 28, 24 and a capacitance 26. An inductance of the LLC resonant circuit can be the primary coil 28 of the transformer, by means of which energy is transferred from the primary side 7 to the secondary side 8 in order to supply energy to the light-emitting means. The switches 21, 22 are switched in clocked fashion alternately by the control device 14. By setting the switching frequency and/or the on time ("Ton time") and/or a dead time of the switches 21, 22, during useful operation the gain of the LLC resonant converter can be set in order to provide an output current assigned to the resistance set on the secondary side, a corresponding output voltage and/or a corresponding output power.

The control device 14 has the input 41, to which the voltage at the resistance 23 can be supplied. Analog-to-digital conversion can be performed. Such a connection for coupling the control device to the resonant converter is often already provided in conventional integrated semiconductor circuits for controlling resonant converters in order to identify fault states. Correspondingly, the control device 14 does not need to be provided with an additional connection pin in order to be able to implement the identification of the resistance 15 set on the secondary side in the operating phase for identifying the selected configuration. An additional insulator for bypassing the SELV barrier is not required either in order to make possible the identification of the resistance 15 by the control device 14. The transformer with the coils 28, 29 can also be used as transfer device for identifying the resistance 15 in the first operating phase.

As already mentioned, further measured variables such as, for example, the bus voltage Vbus can also be evaluated as detected measured variable in addition or as an alternative. The current flowing when the switch 22 is switched on (on the low-potential side of the half-bridge) corresponds, during this phase, to the current in the primary coil 28. Thus, the current isns flowing on the low-potential side of the half-bridge and therefore the current flowing in the primary coil 28 can be detected at the shunt resistor 23. Thus, for example when evaluating the current isns through the primary coil 28 or the peak value of the current flowing through the primary coil 28, the present value of the bus voltage Vbus can also be taken into consideration since, by virtue of the knowledge of the present value for the current through the switch 22 or through the primary coil 28 and the bus voltage Vbus, it is possible to draw a conclusion on the power consumed by the DC-to-DC converter since current multiplied by voltage gives the power.

The control device 14, which can be configured as an ASIC or another integrated semiconductor circuit, can set various operational parameters for controlling the power factor correction circuit and/or the LLC resonant converter depending on the identified resistance 15. The operational parameters which are determined by the control device depending on the set resistance and are used by the control device for corresponding driving of switches on the primary side 7 in the further operating phase can comprise at least one operational parameter of the power factor correction circuit, for example a switching frequency at which a power switch of the power factor correction circuit is switched. The operational parameters which are determined by the control device 14 depending on the identified resistance 15 and are used by the control device 14 for corresponding driving of switches of the primary side 7 in the further operating phase can comprise at least one operational parameter of the LLC resonant converter. The at least one operational parameter of the LLC resonant converter can comprise a switching frequency, an on time ("Ton time") and/or an off time ("Toff time") and/or a dead time of the switches 21, 22 in the half-bridge. As an alternative or in addition, the control device can select an operating mode for the LLC resonant converter depending on the resistance 15 identified. For example, the LLC resonant converter can be controlled depending on the identified resistance 15 in such a way that, selectively, pulsed operation or non-pulsed operation of the half-bridge driving takes place. As a result, the control device 14 can control the operating device in such a way that an output current assigned to the resistance value set on the secondary side and/or an output power assigned to the resistance value set on the secondary side and/or an output voltage assigned to the resistance value set on the secondary side is provided to the illuminant 3.

The secondary side 8 has a first switching means 36 and a second switching means 37. The first switching means 36 and the second switching means 37 can each comprise a field-effect transistor (FET), in particular a MOSFET. The secondary side 8 is configured in such a way that, in the operating phase in which the resistance 15 is intended to be identified, the first switching means 36 is in the on state. The secondary side 8 can be configured in such a way that, in the operating phase in which the resistance 15 is intended to be identified, the second switching means 37 is in the off state. In this way, the risk of distortion in the identification of the resistance set on the secondary side, which could be brought about by a current flow through the illuminant 3, for example, can be reduced. The secondary side 8 is configured in such a way that, in the further operating phase, i.e. during useful operation, the second switching means 37 is in the on state. The secondary side 8 can be configured in such a way that, in the further operating phase, i.e. during useful operation, the first switching means 36 is in the off state. In this way, the dissipation in the resistance 15 can be reduced during useful operation. The secondary side 8 can be configured in such a way that the first switching means 36 is automatically switched from the on state to the off state after a first time period, in which the control device 14 drives the half-bridge circuit with preset operational parameters in order to identify the configuration established by the resistance 15. For this purpose, a corresponding charging capacitor can be used, as will be described in more detail. The secondary side 8 can be configured in such a way that the second switching means 37 is automatically switched from the off state to the on state after a second time period, which is at least the same length as the first time period. For this purpose, a corresponding charging capacitor can be used, as will be described in more detail.

The first switching means 36, the second switching means 37 and the resistance 15 can be provided in an operating device for the light-emitting means. In a further configuration, the first switching means 36, the second switching means 37 and the resistance 15 can be integrated in an LED module, for example. In yet a further configuration, the first switching means 36 and the resistance 15 can be arranged in the operating device, and the second switching means 37 can be integrated in the LED module. In yet a further configuration, only the resistance 15 can be integrated in an LED module, and the first switching means 36 and the second switching means 37 can be provided in an operating device for the light-emitting means.

Other configurations of the operating devices in accordance with exemplary embodiments can likewise be used. For example, other types of converters can be used.

Figure 6:
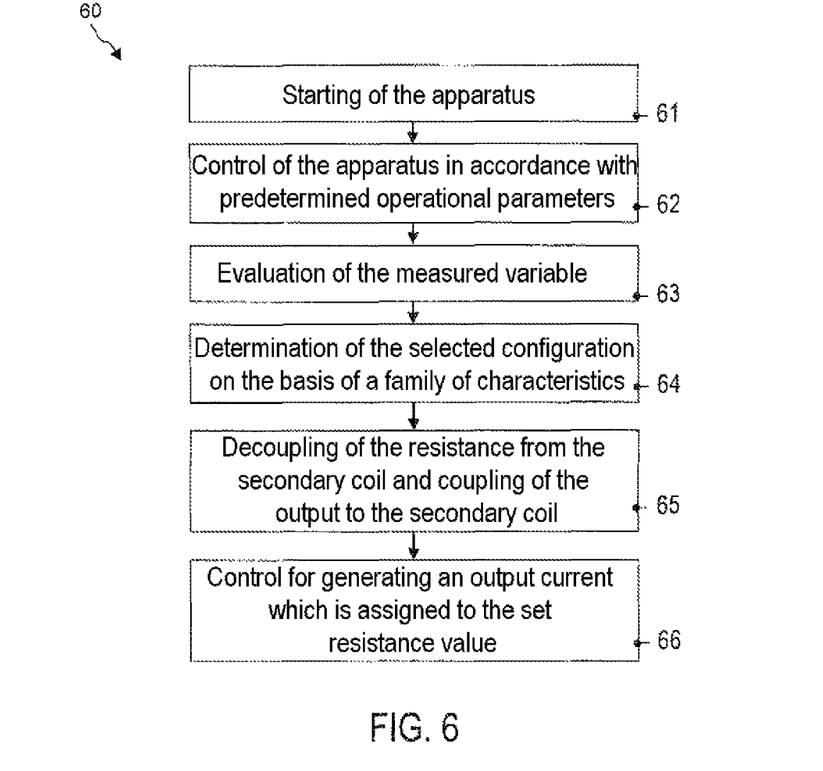
FIG. 6 shows a flowchart of a method in accordance with one exemplary embodiment.

FIG. 6 shows a flowchart of a method 60 in accordance with an exemplary embodiment. The method can be implemented automatically using the apparatus in accordance with an exemplary embodiment, wherein the control device 14 performs the corresponding control and evaluation functions.

At 61, the apparatus is started. After starting of the apparatus, at 62 the apparatus is controlled in accordance with predetermined operational parameters. These predetermined operational parameters can comprise, for example, a preset, fixed switching frequency for half-bridge driving. During this operating phase, a measured variable is detected on a primary side of the apparatus, which measured variable is dependent on the resistance coupled to a secondary coil of a transformer.

At 63, the measured variable is evaluated in order to identify the configuration for the apparatus which is established via the secondary-side resistance. The identification of the selected configuration can comprise the determination of a peak value of a current through a branch of the half-bridge circuit.

At 64, at least one operational parameter of the apparatus is determined for the subsequent further operating phase on the basis of the measured variable detected on the primary side. This can take place on the basis of a family of characteristics, for example as a result of at least one table query. It is possible for at least one family of characteristics to be used, in which an operational parameter of the apparatus is stored as a function of the peak value, determined at 63, of the current. It is also possible for a plurality of families of characteristics to be used, for example a first family of characteristics which draws a relationship between the peak value, determined at 63, of the current and one of a plurality of resistance values, and a second family of characteristics, which draws a relationship between the resistance values and in each case operational parameters. The operational parameters determined at 64 can be selected in such a way that they result in different output currents and/or output powers and/or output voltages of the apparatus, which are fixedly assigned in each case to resistance values set on the secondary side.

At 65, the resistance is decoupled from the secondary coil on the secondary side in such a way that in the subsequent further operating phase, there is no longer any current flowing through the resistance with which different configurations for the operation are selectable. At 65, an output of the apparatus can be coupled to the secondary coil in order to enable a supply of energy to the light-emitting means in the subsequent further operating phase.

At 66, the control device controls the apparatus in accordance with the operational parameters determined at 64. The control device can control at least one power switch in the primary-side circuit in such a way that an output current of a plurality of selectable output currents is set which corresponds to the configuration selected via the resistance. As an alternative or in addition, the control device can control at least one power switch in the primary-side circuit in such a way that an output power of a plurality of selectable output powers is set which corresponds to the configuration selected via the resistance. As an alternative or in addition, the control device can control at least one power switch in the primary-side circuit in such a way that an output voltage of a plurality of selectable output voltages is set which corresponds to the configuration selected via the resistance. The control of the apparatus at 66 can comprise control of a power factor correction circuit and/or control of switches of a resonant converter with half-bridge driving.

Figure 7:
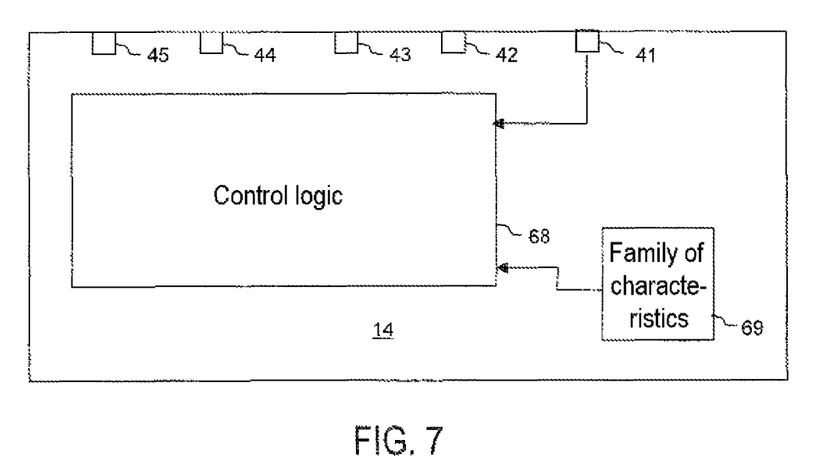
FIG. 7 shows a block diagram illustration of a control device which can be used in apparatuses in accordance with exemplary embodiments.

FIG. 7 is a block diagram illustration of a control device 14 which can be used in apparatuses in accordance with exemplary embodiments. The control device 14 can be configured as an integrated semiconductor circuit, in particular as an application-specific integrated semiconductor circuit (ASIC).

The control device 14 has control logic 68 in order to generate control signals and output said control signals via outputs 42-44 in order to control a primary-side circuit of the apparatus. For example, a control signal for a power switch of a power factor correction circuit can be output via the output 44, which control signal is generated by the control logic 68. For example, control signals for half-bridge driving can be output via the outputs 42, 43, which control signals are generated by the control logic 68. The control device 14 can have inputs in order to monitor various variables of the primary-side circuit. For example, a bus voltage which is provided by a power factor correction circuit can be monitored at an input 45.

The input 41 of the control device 14 is configured to receive a measured variable which corresponds, for example, to a current in a branch of a half-bridge circuit. Such a current can correspond to the current which is flowing in the primary coil 28 when the switch 22 on the low-potential side of the half-bridge is switched to the on state.

The control logic 68 can determine a peak value of the current which is detected after starting of the apparatus in an operating phase. In this operating phase, the current can be monitored in order to identify the resistance 25 on the secondary side. Depending on the peak value of the current, a query in respect of a family of characteristics 69 can be performed. As a result, at least one operational parameter can be determined, in accordance with which the control logic 68 generates control signals in the further operating phase in order to control components on the primary side of the operating device.

As has been described with reference to FIG. 5, the secondary side 8 of the apparatus in accordance with exemplary embodiments can be configured in such a way that, in the operating phase in which the configuration established by the resistance 15 is identified, energy is not yet supplied to the light-emitting means. The secondary side 8 can also be configured in such a way that, in the further operating phase, i.e. during useful operation, there is no longer any current flowing through the resistance 15. Implementations of the secondary side which can be used in apparatuses in accordance with exemplary embodiments are described with reference to FIG. 8 and FIG. 9. For improved understanding, the illuminant 3 is in this case illustrated in each case likewise schematically.

Figure 8:
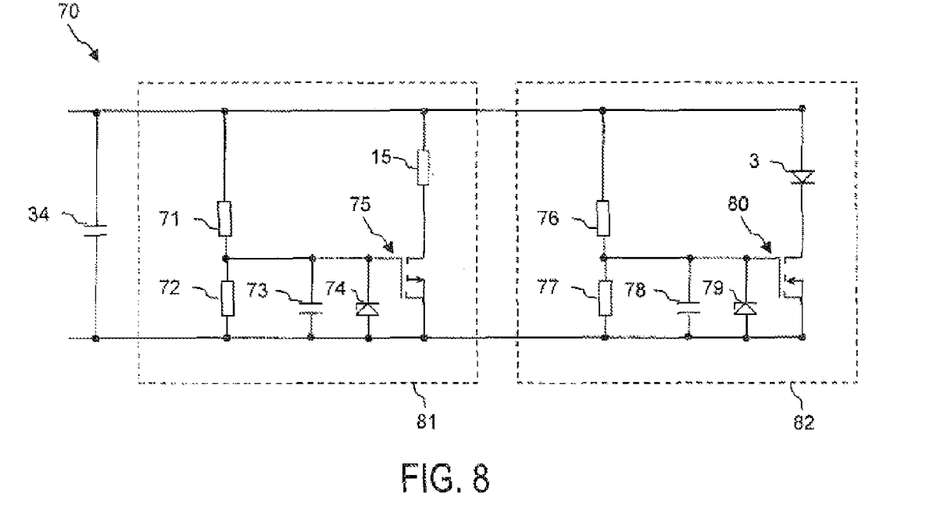
FIG. 8 shows a circuit diagram of a section of a secondary side of apparatuses in accordance with exemplary embodiments, which is connected to an illuminant.

FIG. 8 shows a circuit diagram of a section of a secondary side 70 of apparatuses in accordance with exemplary embodiments, which apparatuses are connected to an illuminant 3. The secondary side has a first switching means having a first MOSFET 75 and a second switching means having a second MOSFET 80. The first MOSFET 75 for decoupling the resistance 15 can be a p-channel MOSFET, and the second MOSFET 80 for coupling the light-emitting means can be an n-channel MOSFET, or vice versa.

In order to automatically decouple the resistance 15 after a predetermined time, a charging capacitor 73 is provided, which is connected to a gate of the first MOSFET 75. The charging capacitor 73 can be charged via a voltage divider having resistances 71, 72, which is connected in parallel with the output capacitor 34. In order to protect the gate of the first MOSFET 75, a zener diode 74 can be provided which is connected to the gate of the first MOSFET 75.

The voltage divider having the resistances 71, 72, the charging capacitor 73 and the first MOSFET 75 are in this case configured in such a way that, when the control device controls the apparatus in the operating phase for determining the selected configuration with predetermined operational parameters, the MOSFET 75 is switched to the off state after a first time period. This first time period can be a few milliseconds, for example ten milliseconds or more than ten milliseconds.

In order to begin a supply of energy to the illuminant 3 automatically only after a predetermined time, a further charging capacitor 78 is provided, which is connected to a gate of the second MOSFET 80. The further charging capacitor 80 can be charged via a voltage divider having resistances 76, 77, which is connected in parallel with the output capacitor 34. In order to protect the gate of the second MOSFET 80, a further zener diode 79 can be provided.

The voltage divider having the resistances 76, 77, the further charging capacitor 78 and the second MOSFET 80 are in this case configured in such a way that, when the control device controls the apparatus in the operating phase for determining the selected configuration with predetermined operational parameters, the second MOSFET 80 is switched to the on state after a second time period. This second time period can be equal to the first time period or greater than the first time period after which the first MOSFET 75 is switched to the off state.

The control device on the primary side 14 of the apparatus can be configured in such a way that, once the first time period has elapsed or once the second time period has elapsed, it automatically begins control of the apparatus, which corresponds to the configuration selected by the resistance 15 and which uses operational parameters, for example switching frequencies, determined for this configuration.

During operation of the apparatus, this configuration of the secondary side 70 has the effect that, during the operating phase in which the configuration established by the resistance 15 is determined, a first section 81 acts as effective load on the secondary side of the transformer. No energy is yet supplied to the illuminant 3. During the subsequent further operating phase, i.e. useful operation, the first section 81 is effectively switched off and a supply of current to the illuminant 3 takes place in the second section 82.

In a configuration of the secondary side, as has been explained with reference to FIG. 8, no logic is required for actively decoupling the resistance 15 on the secondary side 70.

Figure 9:
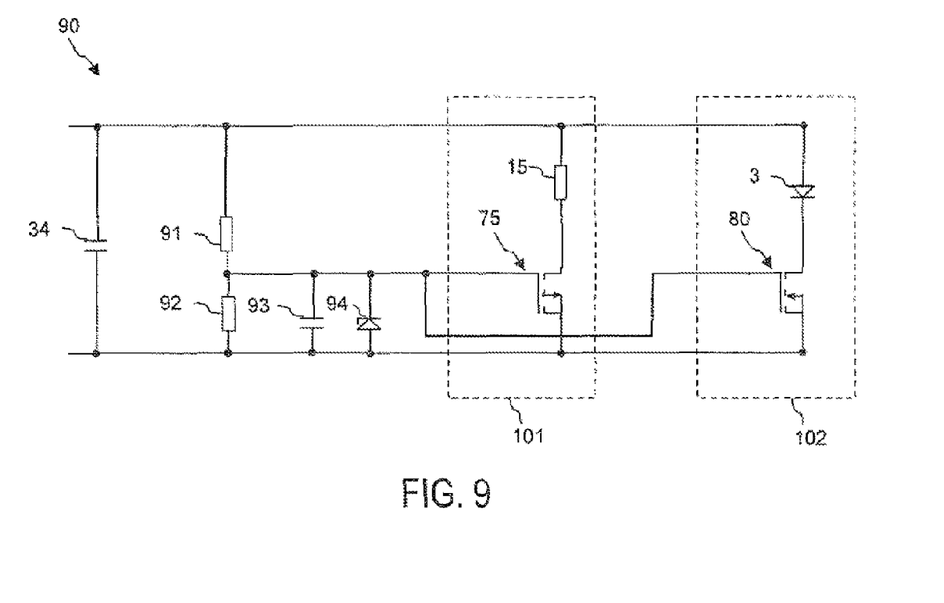
FIG. 9 shows a circuit diagram of a section of a secondary side of apparatuses in accordance with further exemplary embodiments, which is connected to an illuminant.

FIG. 9 shows a circuit diagram of a section of a secondary side 90 of apparatuses in accordance with exemplary embodiments, which is connected to an illuminant 3. The secondary side 90 has a first switching means with a first MOSFET 75 and a second switching means with a second MOSFET 80. The first MOSFET 75 for decoupling the resistance 15 can be a p-channel MOSFET, and the second MOSFET 80 for coupling the light-emitting means can be an n-channel MOSFET, or vice versa.

In order to decouple the resistance 15 automatically after a predetermined time and to switch the second switching means to the on state, a charging capacitor 93 is provided, which is coupled to the gate of the first MOSFET 75 and the gate of the second MOSFET 80. The charging capacitor 93 can be charged via a voltage divider with resistances 91, 92, which is connected in parallel with the output capacitor 34. In order to protect the gate of the first MOSFET 75 and the gate of the second MOSFET 80, a zener diode 84 can be provided.

The voltage divider with the resistances 91, 92, the charging capacitor 93, and the first MOSFET 75 are in this case configured in such a way that, when the control device controls the apparatus in the operating phase for determining the selected configuration with predetermined operational parameters, the MOSFET 75 is switched to the off state after a first time period. This first time period can be a few milliseconds, for example ten milliseconds or more than ten milliseconds. The voltage divider with the resistances 91, 92, the charging capacitor 93 and the second MOSFET 80 are configured in such a way that, when the control device controls the apparatus in the operating phase for determining the selected configuration with predetermined operational parameters, the second MOSFET 80 is switched to the on state after a second time period. This second time period can be equal to the first time period, shorter than the first time period or greater than the first time period after which the first MOSFET 75 is switched to the off state.

Configurations of the secondary side of the apparatus, as have been described with reference to FIG. 8 and FIG. 9, can be used in apparatuses and methods in accordance with each of the exemplary embodiments described here. The first MOSFET, the second MOSFET and the corresponding components which effect automatic switching after specific time periods can in this case be integrated in an operating device for the light-emitting means, for example.

While exemplary embodiments have been described with reference to the figures, modifications can be realized in further exemplary embodiments. While an ohmic resistance which can be set to different resistance values can be provided on the secondary side of the apparatus, it is also possible for corresponding alternating resistances to be used, which can be set, for example, in a user-defined manner in order to select different configurations for the operation of the apparatus.

While a peak current in a branch of a half-bridge circuit can be used to identify the secondary-side resistance, it is also possible for other measured variables to be detected on the primary side in order to identify the secondary-side resistance or the selected configuration. For example, an average value of the current in the branch of the half-bridge circuit can be used in order to identify the configuration, i.e., for example, the output current, which is selected in the operating phase prior to useful operation.

Inductances and capacitances can each be formed by corresponding inductive or capacitive elements, for example in the form of coils or capacitors. However, it is also possible for relatively small inductances, for example one of the inductances of a resonant circuit, to be formed as leakage inductances. Similarly, relatively small capacitances can be formed as leakage capacitances.

The DC-to-DC converter, which has been explained in the exemplary embodiments with reference to an exemplary resonant converter with half-bridge driving, can also be formed by another clocked converter circuit such as, for example, an isolated flyback converter, an isolated push-pull converter, an isolated SEPIC converter, an isolated Cuk converter or else by a non-isolated converter such as, for example, a step-down converter, a flyback converter or a step-up converter. In principle, such a DC-to-DC converter has at least one clocked switch and at least one inductance, wherein this inductance is magnetized and demagnetized alternately by the switch, and a measured variable is detected within the DC-to-DC converter by the control device. By means of the detected measured variable which is dependent on the resistance which is connected to the output of the DC-to-DC converter, the control device can identify a configuration established by this resistance.

The invention also relates to an apparatus for supplying energy to an illuminant 3, wherein the apparatus 2 is configurable for use for different light-emitting means, wherein a configuration is selectable by a resistance 15 at an output of the apparatus 2, and wherein the apparatus 2 has a DC-to-DC converter with at least one switch 21, 22 and a control device 14, wherein the control device 14 is configured to effect, in an operating phase, clocked switching of the at least one switch 21, 22 in order to identify a configuration established by the resistance 15 depending on a measured variable isns, which is detected during the operating phase within the DC-to-DC converter and which is dependent on the resistance 15 and in a further operating phase, to control the apparatus 2 depending on the established configuration identified. For example, the current through the switch 21 or 22 can be monitored and evaluated as detected measured variable isns. It is also possible for further measured variables such as, for example, the bus voltage Vbus to be evaluated in addition or as an alternative as the detected measured variable.

Apparatuses in accordance with exemplary embodiments can be used as operating devices for light-emitting means, for example as LED converter devices.

What is claimed is:

1. An apparatus for supplying energy to an illuminant, which comprises at least one light emitting diode (LED), the apparatus comprises a resistor having a resistance selectively connected to a secondary coil of a transformer, wherein there is electrical isolation between a primary side a secondary side, wherein the primary side and the secondary side are defined by the transformer in between
   wherein the primary side has at least two switches and a control device, and
   wherein the control device is configured
      to effect clocked switching of the at least two switches in one operating phase in order to identify a configuration established by the resistance depending on a measured variable detected during the operating phase on the primary side, the measured variable is dependent on the resistance, and, in a further operating phase,
      to control the at least two switches depending on the established configuration identified, and wherein the apparatus is configured such that, in the further operating phase, the resistor is automatically decoupled from the secondary coil of the transformer.

2. The apparatus as claimed in claim 1, wherein the secondary side comprises at least one switch and is configured such that a switching state of the at least one switch of the secondary side is different in the operating phase and in the further operating phase.

3. The apparatus as claimed in claim 2, wherein the secondary side further comprises at least one capacitor which is coupled to the secondary coil and the at least one switch of the secondary side in order to switch the at least one switch of the secondary side.

4. The apparatus as claimed in claim 1, wherein the secondary side further comprises a first switch, which is coupled to the resistor, and a second switch, which is coupled to an output to the at least one light emitting diode, and wherein both the first switch and the second switch are switched during transition from the operating phase into the further operating phase.

5. The apparatus as claimed in claim 1, wherein the control device comprises a connection and is configured to process an input signal at the connection during the operating phase for identifying the configuration established by the resistor and to process the input signal at the connection during the further operating phase for implementing at least one control or regulation function.

6. The apparatus as claimed in claim 5, wherein the control device is configured to further identify a fault state depending on the input signal at the connection during the further operating phase.

7. The apparatus as claimed in claim 5,
   wherein the connection of the control device is coupled to a primary coil of the transformer.

8. The apparatus as claimed in claim 7, wherein the measured variable is dependent on a current in the primary coil during the operating phase.

9. The apparatus as claimed in claim 1, wherein the control device is configured to switch, in clocked fashion, the at least two switches in the operating phase in accordance with preset operational parameters and in the further operating phase in accordance with further operational parameters, which are dependent on the established configuration identified.

10. The apparatus as claimed in claim 1, wherein the apparatus is configured as an LED converter device, and wherein the resistance on the secondary side of the LED converter device is set manually to a plurality of different resistance values.

11. The apparatus as claimed in claim 10, wherein each resistance value to which the resistance can be set is assigned to at least one of several different output currents; one of several different output voltages or one of several different output powers.

12. A method for controlling an apparatus (2) for supplying energy to an illuminant, wherein the apparatus comprises electrical isolation between a primary side and a secondary side, and at least two switches on the primary side, wherein the secondary side has a resistor having a resistance for selecting different configurations for operation of the apparatus, wherein the method comprises:
   detecting a measured variable on the primary side during an operating phase, wherein the measured variable is dependent on the resistance on the secondary side, identifying a configuration established by the resistance for operation of the apparatus depending on the detected measured variable, and controlling the at least two switches by a control device depending on an established configuration identified in a further operating phase, the resistor is decoupled from a secondary coil of a transformer at the end of the operating phase, and wherein a supply of energy to the illuminant only begins in the further operating phase.

13. The method as claimed in claim 12, further comprising evaluating an input signal is supplied to a connection of the control device during the operating phase for identifying the configuration established by the resistance and during the further operating phase for at least one control or regulation function.

* * * * *